United States Patent Office 2,984,571
Patented May 16, 1961

2,984,571

AQUEOUS BASED LIQUID FOOD SUBSTANCES

George H. Kinsman, Wauwatosa, and Nison N. Hellman and Dwight L. Baker, Milwaukee, Wis., assignors to Basic Products Corporation, Milwaukee, Wis., a corporation of Wisconsin No Drawing. Filed July 2, 1959, Ser. No. 824,474

9 Claims. (Cl. 99—151)

The present invention relates to the preparation of aqueous based liquid food substances, and more particularly to the preparation of non alcoholic aqueous beverages such as milk, fruit juices, fruit flavored beverages, and the like.

It is well known that many aqueous based liquid food substances, which are either solutions or suspensions of a food product in water, develop definite off-flavors associated with chemical deterioration upon standing, particularly after the products have been exposed to oxygen from the atmosphere. The development of off-flavors and deterioration of taste is outstandingly noticeable in the case of milk and orange juice for example, both of which are aqueous based averages which are highly susceptible to chemical deterioration. The off-flavors which develop in these food substances are quite pronounced and being readily noticed, are a source of dissatisfaction to consumers.

Milk, when exposed to light and particularly to certain metals such as copper, rapidly deteriorates to produce undesirable tastes and off-flavors. The use of highly sterile conditions and stainless steel equipment in the processing plants has corrected this problem to some extent although it is difficult to prevent exposure of milk to light or to exclude completely substances effecting the development of off-flavors.

In the case of fruit juices, such as orange juice, the presence of oxygen results in a flavor change in the liquid with the formation of outstanding characteristic off-flavors. These off-flavors are particularly predominant once the orange juice has been exposed to air and then stored for a few hours. The off-tastes develop even when the orange juice, or milk, is stored in a refrigerator. The extent of the deterioration is believed to depend upon a number of factors including time, temperature, exposure to light, and the presence of certain ingredients in the liquid. Although in commercial practice every effort is made to minimize the influence of such factors, the handling of the food substance unavoidably involves the introduction of a number of accelerator effects leading to the development of off-flavors in the product.

It is the primary object of the present invention to provide an improved, stabilizer for aqueous based liquid food substances which is capable of preventing chemical deterioration and the production of off-flavors in the food. More specifically it is an object of the invention to provide a new and improved substance for improving the stability of milk and orange juice, which substance is not only wholesome and completely unobjectionable for food use, but which does not impart any odor or taste of its own to the food nor accentuate or mask flavors derived from the food constituents.

Another object of the present invention is to provide an improved food stabilizer of the foregoing character which is effective in preventing the oxidation or destruction of natural constituents of the food product, to which it is added, and which is an effective stabilizer even when added only in trace or very small quantities.

Still another object of the present invention is to provide a stabilizer of the foregoing type which is easy to use, which does not require complicated procedures or processes for its addition, and which is stable during periods of storage or transit of the product.

A more specific object of the present invention is to provide an improved stabilizer for aqueous suspended food products such as orange juice and milk, comprising adenine (6 amino purine). More particularly, it is an object of the invention to provide an improved method of stabilizing orange juice, milk and the like against oxidation, comprising the addition to the food product of a trace of adenine, whereby the original flavor or taste and other desirable characteristics of the food product are maintained over substantially longer periods of time than heretofore possible even though substantial amounts of air or other sources of chemically combinable oxygen are present in the containers in which the beverages are packaged.

As pointed out above, it is known that if a food product, such as orange juice, is exposed to the atmosphere and allowed to sit over a period of time, which may even be relatively short, that a definite and noticeable off-taste appears. This off-taste is outstandingly noticeable when the older juice is compared to a fresh product. The same phenomenon is noticed with milk, particularly if there is exposure to sunlight or other source of ultraviolet light, or if the processing equipment allowed even traces of contamination with metals such as copper. The taste of an oxidized sample of orange juice or milk is easily detected by any moderately trained taste tester, and in fact, a difference in taste between an older, oxidized, product and a fresh product can be readily detected by most consumers.

In accordance with the present invention, an aqueous food substance is stabilized against oxidation without affecting its taste and other desirable characteristics, by adding to the product, at any suitable stage in its production, for example before packaging, a trace of the adenine (6 amino purine). The actual amount of the adenine to be added depends upon a number of factors, including the amount of air in the headspace in the package, the amount of air entrapped, occluded or dissolved during production and processing of the food product, the treatment or packaging of the product, and variations in the product itself. For instance, orange juice initially contains quite a high concentration of ascorbic acid which, however, is insufficient or incapable of protecting the orange juice from oxidation. These natural substances will, of course, influence the amount of antioxidant material that may or need be added. The food substance may be a solution of the food in water (e.g. milk) or may be a suspension (e.g. orange juice). Adenine has been found to be equally effective as a stabilizer for both.

Accelerated tests have been made upon orange juice and milk and the examples set forth below illustrate the effect of additions of adenine on preservation of flavor and the prevention of the development of an off-taste. Because the taste of an oxidized sample of both orange juice and milk is very readily detected upon comparison with a fresh sample of a food product by even the most inexperienced tester, the surest way of evaluating the tests is by a simple organoleptic taste test. The tests are necessarily accelerated so as to obtain noticeable variations in taste in a relatively short time. The results of these tests can, however, be extrapolated over the expected shelf life of the food substance in order to predict the effect of additions of adenine as a stabilizer.

EXAMPLE I

Fresh machine squeezed California Valencia orange juice was used in the following test, and no extraneous preservatives were added. Scrupulously clean 12 oz. bottles were used and the crowns and lips on the bottles were maintained sterile with a 70% aqueous methanol solution to insure that no bacteria were accidentally added. After storing the samples under conditions conducive to oxidation, the samples were taste tested by a panel of members trained to detect oxidized flavors in orange juice.

Each taste test consisted of tasting two sets of five samples each of such orange juice, identified and treated according to the following scheme: One group of samples was fresh orange juice squeezed on the day of the test. A second set of samples, identified as the "C" samples were prepared by filling a 12 oz. bottle completely full of orange juice and capping them immediately so that no air remained in the bottle except that amount which was dissolved in the orange juice. Further samples of orange juice were prepared having 300 milliliters of orange juice per bottle, leaving approximately 75 ml. free of air in each of the three bottles. Of these samples, a group was left untreated as a control and identified as "$C_{ox}$" samples. The remaining samples were treated by adding various amounts of adenine (6 amino purine) from a stock solution containing 20 mg. 1 ml. The bottled samples, namely, the controls "C" and "$C_{ox}$" and those with additions of adenine, were stored at 30° F. with daily agitation for a period of seven days. The results of taste evaluations of these samples and the freshly prepared samples are tabulated in Table I. In making their evaluations, the members of the taste panel scored the samples on a basis of 1 to 10. A score of 1 was used to indicate a relatively fresh sample of orange juice, and a score of 10 to indicate a sample which was highly oxidized in flavor. The scores of the panel members were averaged and these scores are presented in Table I.

*Table I*

TASTE TEST EVALUATION OF ADENINE AS AN ORANGE JUICE FLAVOR STABILIZER

| Treatment | | |
|---|---|---|
| Adenine Added, p.p.m. | Presence of 75 ml. Air In The Headspace | Average Taste Test Score (1-10 Basis) |
| (CF Fresh) | No Air | 1.60 |
| (C Control, Stored in Close Container) | do | 3.30 |
| ($C_{ox}$ Control, Oxidized) | Air | 7.50 |
| 0.25 | do | 4.5 |
| 1.25 | do | 4.3 |
| 2.50 | do | 4.0 |
| 7.50 | do | 4.5 |
| 12.5 | do | 6.0 |
| 15.0 | do | 5.2 |
| 25.0 | do | 4.25 |
| 50.0 | do | 3.6 |

From the observations of the average taste test scores in the third column of Table I, certain conclusions can be drawn. The samples designed "C," stored in the absence of extra air in the headspace, were obviously oxidized more than the freshly squeezed orange juice, indicating that dissolved air could cause the development of oxidized flavor. Comparison of the scores obtained by the control "C" samples and by the "$C_{ox}$" oxidized samples indicate that the presence of air in the headspace leads to an oxidized flavor development in orange juice. Scores obtained in the case of samples treated with adenine were, in each case, lower than the score obtained by the "$C_{ox}$" oxidized sample. This illustrates that the adenine effectively inhibited the development of oxidized flavor in orange juice under these highly adverse conditions.

It can be readily seen from Table I that even the addition of extremely small amounts of adenine (as low as 0.25 p.p.m.) is effective in promoting stabilization of the product. It is apparent that the stabilized product, even under the extremely adverse oxidation conditions, remains nearly as good as the stored control.

It has been discovered that adenine appears to have a further effect on the orange juice medium. Orange juice is known to contain ascorbic acid which is subject to oxidation. It was noted, when ascorbic acid determinations were carried out on the samples, that the unprotected samples lost on the average of 12% of the available ascorbic acid in them, while the treated samples were substantially free of any destructive loss of ascorbic acid.

EXAMPLE II

Homogenized milk was tested by purchasing a quantity of milk from a local dairy. Scrupulously clean 12 oz. bottles were used to contain the samples of the milk. To some of these bottles there was added small amounts of adenine in amounts of between 0.25 and 25 p.p.m. while other bottles, identified as samples "C" and "$C_{ox}$," were left untreated as controls.

Some of the control samples, identified as "C" sample, were stored at 30° F. for 35 hours without exposure to light. The oxidized control samples, identified as "$C_{ox}$," and the samples treated with adenine were exposed, in clear 12 oz. bottles, to strong sunlight for 2 hours and then were stored at 30° F. for 35 hours.

Following the storage, the samples were taste tested by an experienced panel trained to recognize very low levels of oxidized flavor in milk. The results of these tests are presented in Table II.

*Table II*

TASTE TEST EVALUATION OF ADENINE AS A STABLIZER FOR MILK

| Treatment | | Average Taste Test Score (1-10 Basis) |
|---|---|---|
| Adenine Added, p.p.m. | Sun Exposure | |
| (C Control) | None | 1.37 |
| ($C_{ox}$ Control, Oxidized) | Sunlight | 7.80 |
| 0.25 | do | 5.7 |
| 0.50 | do | 4.6 |
| 1.25 | do | 4.3 |
| 2.50 | do | 5.9 |
| 7.50 | do | 4.4 |
| 12.5 | do | 4.3 |
| 15.0 | do | 5.9 |
| 25.0 | do | 5.0 |

From the average taste test scores tabulated in Table II, it can be seen that exposure to 2 hours of sunlight caused a great separation in scores between the exposed and unexposed samples. The treatment with adenine definitely decreased the scores in each of the cases. These tests clearly show that the addition of a small amount of adenine substantially decreases the development of oxidized flavor in the milk when the samples are exposed to sunlight to stimulate oxidation.

The tables of taste test results reported in connection with the above four examples indicate that adenine possesses marked flavor stabilizing potential in aqueous suspended food substances even at extremely low concentrations.

Since adenine itself is a naturally occurring material and is suitable for use in foods, it is presumed that there is no toxic upper limit on its use, and since adenine has no strongly recognizable flavor, there is no upper limit to its use for this reason. The preferred concentration range for the use of adenine appears to have no upper limit up to and past 50 parts per million, the highest concentration used in these tests. This upper limit is of minor significance, however, since the use of excess adenine would be prohibitively expensive.

A lower limit for the effective use of adenine in orange juice and milk has been found to be between about 0.25 and about 0.50 part per million, although further work has indicated that a concentration as low as 0.05 part per million is effective to some extent in stabilizing the aqueous food product.

In practicing the invention, it is expected that adenine could be added in such quantities that the stabilizing characteristics which it imparts to the product are retained over a normal storage period. While the amount of adenine to be added depends to some extent upon the air present in the package, practically, this factor is secondary to the time factor and, in fact, even a small amount of adenine is sufficient for a wide range of storage conditions and oxygen content. The amount of adenine to be used also will depend upon the food substance itself. For example, although a small amount of adenine (in the order of 0.25 part per million) gives noticeable protection to both orange juice and milk, the level of protection is different for each. The nature of the food must therefore be considered and the adenine added according to the susceptibility of the food substance to the development of off-flavors. The adenine employed as described above, may be prepared in any suitable way.

It has not been possible to test the related purines such as guanine, zanthine and uric acid, other than to note in preliminary tests that all are positive in their inhibitory effect on the development of oxidized flavors in aqueous based food substances. It is not unlikely that certain of these may have effectiveness for this purpose. Obviously if one skilled in the art after reading the specification were to test such a compound and find it suitable for this purpose, the use of such an equivalent material would be within the spirit and scope of the invention as expressed in the appended claims.

We claim as our invention:

1. In the method of producing aqueous based liquid food substances stabilized against the development of off-tastes due to oxidation, the step which consists of adding thereto the compound adenine in an amount sufficient to effect substantial stabilization thereof against oxidation without substantially affecting its wholesomeness, flavor, appearance and other desirable characteristics.

2. The method of producing orange juice stabilized against the development of off-tastes due to oxidation comprising the step of adding thereto adenine in an amount sufficient to effect substantial stabilization thereof against oxidation without substantially affecting its wholesomeness, flavor, appearance and other desirable characteristics.

3. The method of producing milk stabilized against the development of off-tastes due to oxidation comprising the step of adding thereto adenine in an amount sufficient to effect substantial stabilization thereof against oxidation without substantially affecting its wholesomeness, flavor, appearance and other desirable characteristics.

4. The method of producing aqueous based liquid food substances stabilized against the development of off-tastes due to oxidation comprising adding thereto small amounts of 6 amino purine in an amount sufficient to effect substantial stabilization thereof against oxidation without substantially affecting its wholesomeness, flavor, appearance and other desirable characteristics.

5. An aqueous based liquid food substance stabilized against the development of off-tastes due to oxidation and characterized by the presence therein of adenine in an added amount sufficient to effect substantial stabilization thereof against oxidation without substantially affecting its wholesomeness, flavor, appearance and other desirable characteristics.

6. An aqueous based liquid food substance stabilized against the development of off-tastes due to oxidation and characterized by the presence therein of adenine in an added amount of at least about 0.25 part per million.

7. An aqueous based liquid food substance stabilized against the development of off-tastes due to oxidation and characterized by the presence therein of adenine in an added amount of between about 0.25 part per million and about 50 parts per million.

8. Orange juice stabilized against the development of off-tastes due to oxidation and characterized by the presence therein of adenine in an added amount of at least about 0.25 part per million.

9. Milk stabilized against the development of off-tastes due to oxidation and characterized by the presence therein of adenine in an added amount of at least about 0.25 part per million.

References Cited in the file of this patent

UNITED STATES PATENTS

| | | |
|---|---|---|
| 2,482,724 | Baker | Sept. 20, 1949 |
| 2,497,320 | O'Leary | Feb. 14, 1950 |

OTHER REFERENCES

"Chem. Abstracts," vol. II, page 3053$^6$ (1917).
"Milk Dealer," vol. 29, July 1940, page 41.